US009234963B2

(12) United States Patent
Rakeman

(10) Patent No.: US 9,234,963 B2
(45) Date of Patent: Jan. 12, 2016

(54) OPTICALLY AUGMENTED WEAPON LOCATING SYSTEM AND METHODS OF USE

(75) Inventor: James W. Rakeman, Brea, CA (US)

(73) Assignee: Thales-Raytheon Systems Company LLC, Fullerton, CA (US)

(*) Notice: Subject to any disclaimer, the term of this patent is extended or adjusted under 35 U.S.C. 154(b) by 478 days.

(21) Appl. No.: 13/550,892

(22) Filed: Jul. 17, 2012

(65) Prior Publication Data

US 2015/0192667 A1 Jul. 9, 2015

Related U.S. Application Data

(60) Provisional application No. 61/510,112, filed on Jul. 21, 2011.

(51) Int. Cl.
| F41G 3/14 | (2006.01) |
| G01S 13/86 | (2006.01) |
| G01S 13/06 | (2006.01) |
| G01S 13/72 | (2006.01) |

(52) U.S. Cl.
CPC ............... *G01S 13/865* (2013.01); *F41G 3/147* (2013.01); *G01S 13/06* (2013.01); *G01S 13/723* (2013.01); *G01S 13/867* (2013.01)

(58) Field of Classification Search
CPC ........... F41G 3/14; F41G 3/145; F41G 3/147; G01S 13/06; G01S 13/723; G01S 13/865; G01S 13/867
USPC ........... 89/41.05, 41.06, 41.07; 235/400, 411, 235/412, 413
See application file for complete search history.

(56) References Cited

U.S. PATENT DOCUMENTS

| 4,825,216 A | | 4/1989 | DuFort |
| 5,652,588 A | * | 7/1997 | Miron .............................. 342/58 |
| 5,686,889 A | * | 11/1997 | Hillis ............................. 340/540 |
| H1916 H | | 11/2000 | Hollander |
| 6,215,731 B1 | * | 4/2001 | Smith ........................... 367/128 |
| 6,823,621 B2 | | 11/2004 | Gotfried |
| 6,958,813 B1 | * | 10/2005 | Ahmadjian et al. .......... 356/416 |
| 7,151,478 B1 | | 12/2006 | Adams et al. |
| 7,248,210 B2 | * | 7/2007 | Bruce et al. .................... 342/175 |
| 7,532,542 B2 | | 5/2009 | Baxter et al. |
| 8,809,787 B2 | * | 8/2014 | Tidhar ...................... 250/339.02 |
| 2006/0021498 A1 | * | 2/2006 | Moroz et al. .................. 89/41.06 |

(Continued)

OTHER PUBLICATIONS

PCT Search Report and Written Opinion of the ISA; dated Apr. 26, 2013; for PCT Pat. App. No. PCT/US2012/047011; 9 pages.

(Continued)

*Primary Examiner* — Bret Hayes
(74) *Attorney, Agent, or Firm* — Daly, Crowley, Mofford & Durkee, LLP

(57) ABSTRACT

A method of locating a weapon includes detecting a weapon firing event with an optical sensor, the detected weapon firing event indicative of a detected firing of the weapon and indicative of a detected time of the weapon firing event. The method also includes detecting a projectile fired from the weapon with a radar system. The method also includes calculating a state vector associated with the projectile detection. The method also includes identifying a location of the weapon by backtracking the state vector to the detected time of the weapon firing event time. The method also includes communicating the location of the weapon. A system that implements the method is also described.

25 Claims, 4 Drawing Sheets

(56) References Cited

U.S. PATENT DOCUMENTS

| | | | |
|---|---|---|---|
| 2006/0028373 A1 | 2/2006 | Fullerton et al. | |
| 2007/0158638 A1* | 7/2007 | Perera et al. | 257/13 |
| 2008/0191926 A1* | 8/2008 | Benayahu et al. | 342/52 |
| 2009/0173788 A1* | 7/2009 | Moraites et al. | 235/411 |
| 2009/0260511 A1 | 10/2009 | Melnychuk et al. | |
| 2012/0175418 A1* | 7/2012 | Jones | 235/414 |
| 2012/0217301 A1* | 8/2012 | Namey et al. | 235/411 |
| 2013/0192451 A1* | 8/2013 | Scott et al. | 89/41.05 |

OTHER PUBLICATIONS

PCT International Preliminary Report on Patentability and Written Opinion of the ISA dated Jan. 30, 2014; for PCT Pat. App. No. PCT/US2012/047011; 7 pages.

U.S. Appl. No. 61/571,113, filed Jun. 20, 2011, Varga et al.

* cited by examiner

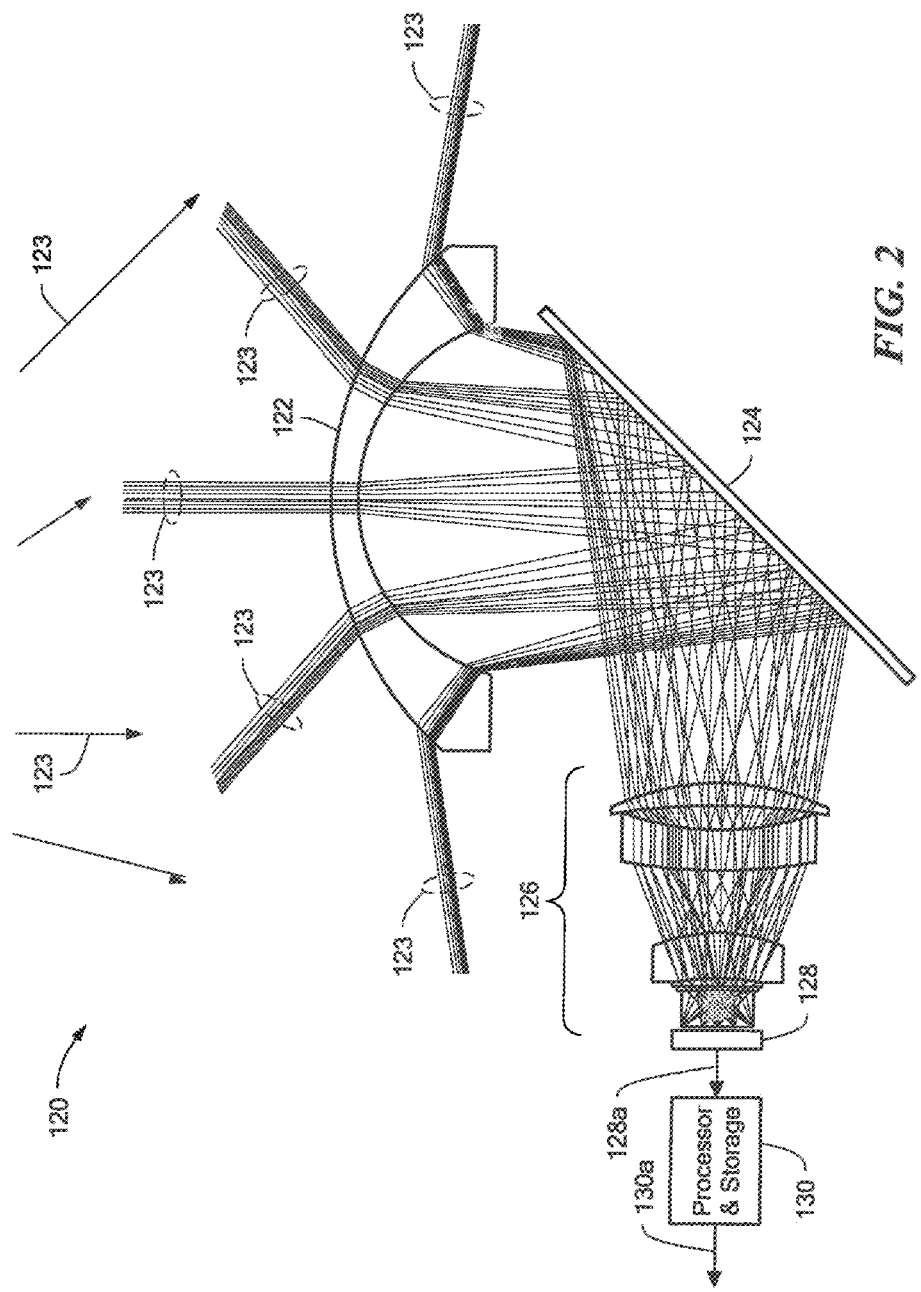

OPTICALLY AUGMENTED WEAPON LOCATING SYSTEM AND METHODS OF USE

CROSS REFERENCE TO RELATED APPLICATIONS

This application claims the benefit under 35 U.S.C. §119(e) of U.S. Provisional Application No. 61/510,112 filed Jul. 21, 2011, which application is incorporated herein by reference in its entirety.

FIELD OF THE INVENTION

This invention relates generally to weapon detection systems and, more particularly, to a weapon detection system that can identify a location of a weapon that fires a projectile with a low elevation angle.

BACKGROUND OF THE INVENTION

Radar systems transmit electromagnetic radiation and analyze reflected echoes of returned radiation to determine information about the presence, position, and motion of objects within a scanned area. Conventional weapon locating systems include a radar system that can detect and track projectiles, such as artillery projectiles, to determine the location of the fired weapon. This determination can be based on an extrapolation of estimated state vectors, derived by radar tracking of a ballistic target, to a point of intersection with terrain. Identified coordinates associated with the point on the terrain approximate the location of the weapon that launched the projectile.

When the elevation angle of the bore of the fired weapon is small relative to the local earth tangent plane, conventional weapon locating systems are generally unable to accurately determine the location of the weapon. Such low angle trajectories produce exaggerated errors in the state vector estimates. As the angle of elevation approaches zero, the intersection point on the terrain becomes indeterminate. At low angle trajectories, weapon location determination is also limited because projectile detection and tracking by radar systems can be limited by impaired lines of sight, radar multipath echoes, and clutter. In addition, the short track life of near-in fire with low angle trajectories creates difficulties in discriminating false targets. When the location of the firing weapon cannot be accurately determined, the ability to return precision counter fire or launch rockets at the firing weapon is impaired.

In view of the above, it would be desirable to provide a system and associated method that can detect the firing location of weapons that fire projectiles with low angle trajectories.

SUMMARY OF THE INVENTION

The present invention provides to provide a system and associated method that can detect the firing location of weapons that fire projectiles with low angle trajectories.

In accordance with one aspect of the present invention, a method of locating a weapon includes detecting a weapon firing event with an optical sensor, the detected weapon firing event indicative of a detected firing of the weapon and indicative of a detected time of the weapon firing event. The method also includes detecting a projectile fired from the weapon with a radar system. The method also includes calculating a state vector associated with the projectile detection. The method also includes identifying a location of the weapon by backtracking the state vector to the detected time of the weapon firing event time. The method also includes communicating the location of the weapon.

In some embodiments, the method can also include one or more of the following aspects.

In some embodiments, the method also includes generating a common time base for the weapon firing event and for the projectile detection.

In some embodiments of the method, the optical sensor comprises an electro-optical sensor.

In some embodiments of the method, the optical sensor includes a flash detection capability.

In some embodiments of the method, the optical sensor comprises a visible light optical sensor.

In some embodiments of the method, the optical sensor comprises an infrared optical sensor.

In some embodiments of the method, the optical sensor comprises an ultraviolet optical sensor.

In some embodiments of the method, the step of detecting the weapon firing event with the optical sensor comprises detecting the weapon firing event by direct path detection of light generated by the weapon firing event.

In some embodiments of the method, the step of detecting the weapon firing event with the optical sensor comprises detecting the weapon firing event by indirect path detection of scattered light from light generated by the weapon firing event In some embodiments of the method, the step of detecting the weapon firing event with the optical sensor comprises detecting visible light generated by the weapon firing event.

In some embodiments of the method, the step of detecting the weapon firing event with the optical sensor comprises detecting infrared light generated by the weapon firing event.

In some embodiments of the method, the step of detecting the weapon firing event with the optical sensor comprises detecting ultraviolet light generated by the weapon firing event.

In some embodiments of the method, the method further includes correlating the weapon firing event detected by the optical sensor with the detection of the projectile by the radar system to determine if the weapon firing event detected by the optical sensor corresponds to the same projectile as that detected by the radar system.

In some embodiments of the method, the correlating includes selecting a time difference threshold, and relating the time difference threshold to a difference between the detected time of the weapon firing event detected by the optical sensor and a time of the detection of the projectile by the radar system.

In some embodiments of the method, the correlating includes selecting a time difference threshold, and relating the time difference threshold to a difference between a time predicted by the state vector when backtracked to a terrain and the detected time of the weapon firing event detected by the optical sensor In some embodiments of the method, the correlating includes selecting a position difference threshold, and relating the position difference threshold to a difference between a location predicted by the state vector when backtracked to a terrain and a location predicted by the state vector when backtracked to the detected time of the weapon firing event detected by the optical sensor.

In some embodiments of the method, the correlating includes selecting an angle difference threshold, and relating the angle difference threshold to a difference between an angle to the projectile identified by the radar system and an angle to the weapon identified by the optical sensor system.

In accordance with another aspect of the present invention, a weapon locating system includes an optical sensor configured to detect a weapon firing event, the detected weapon firing event indicative of a detected firing of the weapon and indicative of a detected time of the weapon firing event. The system also includes a radar system configured to detect a projectile fired from the weapon. The system also includes a processor configured to calculate a state vector associated with the projectile detection and to backtrack the state vector to the detected time of the weapon firing event to identify the location of the weapon. The system also includes a communication system configured to communicate the location of the weapon.

In some embodiments, the system can also include one or more of the following aspects.

In some embodiments of the system, the optical sensor comprises an electro-optical sensor.

In some embodiments of the system, the optical sensor comprises a flash detection capability.

In some embodiments of the system, the optical sensor comprises an infrared optical sensor.

In some embodiments of the system, the optical sensor comprises a visible light optical sensor.

In some embodiments of the system, the optical sensor comprises an ultraviolet optical sensor.

In some embodiments of the system, the processor is further configured to correlate the weapon firing event detected by the optical sensor with the detection of the projectile by the radar system to determine if the weapon firing event detected by the optical sensor corresponds to the same projectile as that detected by the radar system.

BRIEF DESCRIPTION OF THE DRAWINGS

The accompanying drawings illustrate embodiments of the devices and methods disclosed herein and together with the description, serve to explain the principles of the present disclosure.

FIG. 2 is cross-sectional view of an electro-optical system according to an embodiment of the present disclosure;

DETAILED DESCRIPTION OF THE INVENTION

The following disclosure provides many different embodiments, or examples, for implementing different features of the invention. Specific examples of components and arrangements are described below to simplify the present disclosure. These are, of course, merely examples and are not intended to be limiting.

As used herein, the term "state vector" is used to describe a collection of parameters (i.e., one or more parameters) that correspond to set of characteristics of a moving projectile. The one or more state parameters within a state vector can include, but are not limited to, a position (in a coordinate system), a time, a speed, a heading (or three dimensional velocity vector), and acceleration in one or more dimensions, of the moving projectile.

As used herein, the term "backtracking" is used to describe a process by which one or more state vectors, each describing one or more parameters associated with a projectile at a respective one or more positions along a trajectory, can be extrapolated backward in time and space to identify a state vector associated with the projectile at an earlier point along the trajectory. The state vector at the earlier time and space can include both an earlier time and a location of the projectile at the earlier time.

As used herein, the term "terrain" is used to describe topographical characteristics of the earth's surface. The terrain can be represented by numerical values.

In general, electromagnetic radiation is classified by wavelength into radio, microwave, infrared, visible, ultraviolet, X-rays, and gamma rays, in order of decreasing wavelength. As used herein, the term "light" is used to describe at least electromagnetic radiation having a wavelength in the infrared, visible, or ultraviolet portions of the electromagnetic spectrum. Similarly, the term "optical" is used herein to describe a system or component (e.g., sensor) that interacts with or that processes the infrared, visible, or ultraviolet portions of the electromagnetic spectrum.

Figure 1:
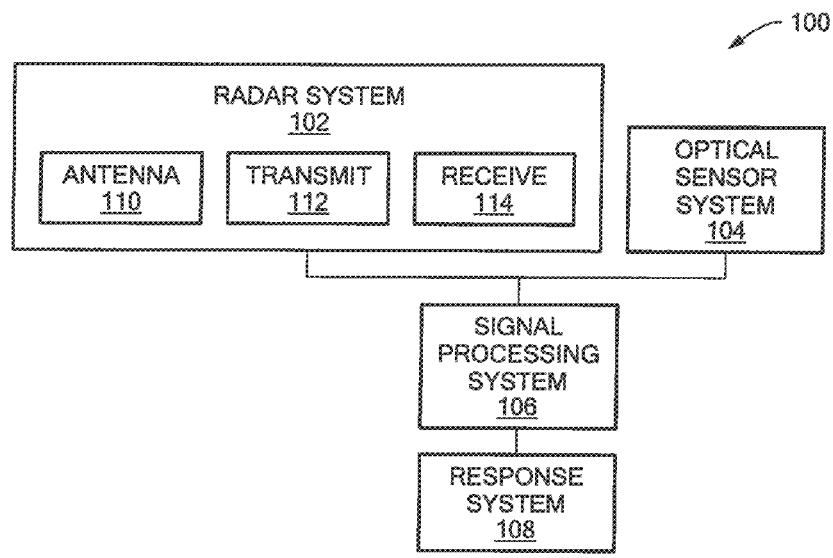
FIG. 1 is a schematic diagram illustrating a weapon locating system according to an embodiment of the present invention.

Referring first to FIG. 1, a weapon locating system 100 includes both a radar system 102 and an optical sensor system 104, both of which communicate signals to a signal processing system 106. Optionally, the signal processing system 106 can transmit information derived from the received signals to a response system 108. The optical sensor system 104 is also referred to as an electro-optical (EO) system herein.

As described in more detail below, a traditional weapon locating system having only a radar system can experience a reduced accuracy when detecting and tracking weapons fired at low quadrant elevations (QE). Quadrant elevation (QE) is a commonly used artillery term to describe the angle between the gun or launchers elevation angle and local horizontal. However when a conventional weapon locating system is combined with an optical sensor system, data generated by the combination of systems (i.e., an optically augmented weapon locating system) can be processed to more accurately determine the location of the fired weapon, particularly at low quadrant elevations (QEs).

The radar system 102 can be capable of detecting and tracking one or more projectiles fired from a weapon. In some embodiments, the radar system 102 can be a phased array radar system, also known as an electronically scanned array ("ESA"), which is a type of radar system that use multiple antennas to transmit and/or receive radiofrequency (RF) signals at shifted relative phases. The phase shifting thus allows the transmitted and/or received RF energy to be transmitted and/or received as transmit and/or received beams that can be electronically "steered" without the need to physically move components of the radar system. Examples of such a phased array radar system used in a conventional non-augmented weapon locating system include the AN/TPQ-36 and the AN/TPQ-37 Firefinder Weapon Locating Systems manufactured by Raytheon Company of Waltham, Mass.

In some embodiments, the phased array can be comprised of transmit and/or receive elements disposed within a common assembly. In some other embodiments, the phased array can be comprised of transmit and/or receive antennas that a spatially separated and not disposed within a common assembly.

Although phased array radar systems can be an effective choice for the radar system 102, other types of radar systems may also be suitable. The radar system 102 can be stationary or mounted on a mobile platform.

The radar system 102 includes an antenna system 110, one or more transmitters 112, and one or more receivers 114. In some embodiments, the transmit and receive functions can be provided by a combined transmit/receive module. While not shown for clarity, it will be understood that the radar system 102 can also include various components such as controllers, duplexers, oscillators, mixers, amplifiers, synchronizers, modulators, antenna positioning systems, power supply systems, data storage devices, and signal pre-processing equipment.

The optical sensor system 104 can be any type of optical sensor system capable of detecting and processing light. For example, the optical sensor system 104 can be an electro-optical (EO) sensor system.

Referring briefly to FIG. 2, FIG. 2 provides a cross-sectional view of an electro-optical (EO) sensing device 120 that may, for example, be used in the optical sensor system 104. The EO device 120 can include a light receiving lens 122 which directs incoming light 123 toward a reflective surface 124. The reflective surface 124 directs the light toward a set of optical components 126, which may include collimating lenses, condensing lenses, filters, mirrors, or other light directing components. The EO device 120 can further include a detector or array of detectors, e.g., a charge coupled device (CCD) array 130, for converting received light energy to electrical signals 130a. The EO device 120 can further include data storage and signal processing components 130 coupled to receive the electrical signals 130a and configured to generate and output signal 130a indicative of one or more of a time of a detected firing event, an azimuth bearing of the detected firing event, or an elevation angle of the detected firing event.

In some embodiments, the lens 122 is a fisheye lens that has a field of view covering 360 degrees in azimuth and at least 90 degrees in elevation. However, in other embodiments, a different lens having a different field of view can be used.

Referring again to FIG. 1, in some embodiments, the EO system 104 can be mechanically coupled to, or can be otherwise geographically proximate to, the radar system 102. However, in some other embodiments, the EO system 104 can be geographically separated from the radar system 102 by any distance.

Radar signals received by the radar system 102 and optical signals received by the optical sensor system 104 can result in electrical (or fiber optic) signals that can be processed by the signal processing system 106. The signal processing system 106 can include one or more computer processors, a data storage system, an output interface, a network interface, and software for processing the signals received from the optical sensor system 104 and the radar system 102. Other hardware, firmware, and software can also be incorporated into the signal processing system 106. The signal processing system 106 can also include a communication system for transmitting, via either wired or wireless connection, data to the response system 108. The communicated data may include a set of fired weapon location coordinates.

The response system 108 can include, for example, a counter fire weapon system capable of returning fire to the location of the fired weapon, a friendly fire detection system capable of determining the location of allied forces, or a threat assessment system for use by peace-keeping or law enforcement agencies to determine a location for follow-up investigation or patrol.

As described more fully below, the weapon locating system 100 can be used to determine a location from which a weapon is fired. The weapon may fire any type of projectiles including shells, shot, missiles, or rockets.

Figure 3:
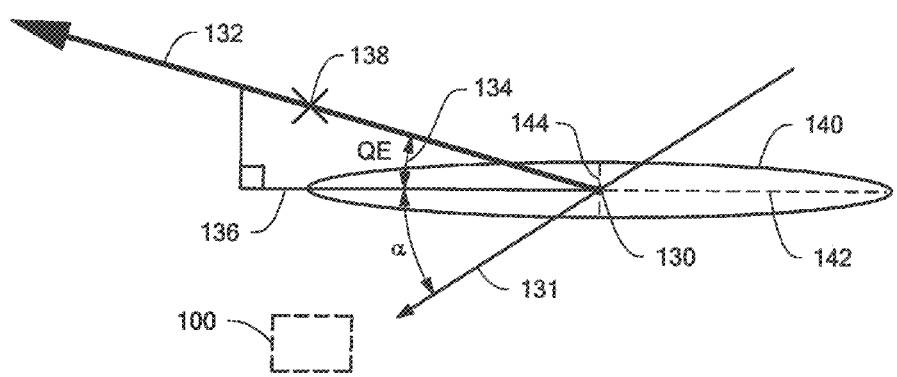
FIG. 3 is a diagram illustrating the trajectory of a projectile fired from a weapon.

Referring now to FIG. 3, when a weapon fires a projectile from a location 130, the projectile follows a trajectory 132. While the trajectory is shown to be a straight line, it will be understood that the trajectory need not be a straight line.

A quadrant elevation (QE) is an angle between an axis 136 upon a horizontal plane and an axis of a bore of the weapon fired from the location 130. A firing azimuth, a, is an angle formed between an axis 131 between the firing location 130 and the radar system 102 (of the weapon locating system 100) and the axis 136.

Acquisition, i.e. detection and tracking, of the fired projectile by the radar system 102 can occur at a location 138 along the trajectory 132. Associated with the location 138, the radar system 102 can generate a state vector that describes one or more characteristics of the projectile and of the trajectory of the projectile. The radar system 102 can make other detections at other points along the trajectory and can form other associated state vectors.

Conventionally, without use of the optical sensor system 104, the radar system 102 and signal processing system 106 can backtrack the resulting one or more state vectors to identify a state vector that intersects the terrain. Conventionally, the intersection can identify the location 130 of the weapon that fired the projectile. However, particularly at low QE, the identification of the location 130 is not precise.

An error associated with the radar system 102 (without use of the optical sensor system 104 (and neglecting radar ranging errors that are generally small compared to angular errors) can be characterized as an "error ellipse" 140 lying along the line-of-fire having a down range error component $\sigma_{DOWN}$ 142 and a cross range error component $\sigma_{CROSS}$ 144. The error components 142, 144 of the error ellipse 140 can be calculated as follows:

$$\sigma_{DOWN} = \sqrt{\frac{VR \cdot \sigma_\varepsilon^2 + \sigma_{\varepsilon\text{-}bias}^2}{\tan^2(QE)} + (VRR \cdot \sigma_\eta^2 + \sigma_{\eta\text{-}bias}^2)\sin^2(\alpha)}$$

$$\sigma_{CROSS} = \sqrt{(VR \cdot \sigma_\eta^2 + \sigma_{\eta\text{-}bias}^2)\cos^2(\alpha)}$$

$$VRR = \frac{1 + 12\left(\frac{N-1}{N+1}\right)\left(\frac{T_{BACK}}{T_{TRACK}} + 0.5\right)^2}{N}$$

where:
$\sigma_\varepsilon$=random component (1 sigma) of the estimated target height in meters;
$\sigma_{\varepsilon\text{-}bias}$=bias component of the estimated target height in meters;
$\sigma_\eta$=random component (1 sigma) of the estimated azimuth error in meters;
$\sigma_{\eta\text{-}bias}$=bias component (1 sigma) of the estimated azimuth error in meters;
$\alpha$=firing azimuth angle in radians;
VR=VRR (in this example a single filter type is used);
VRR=Variance reduction from filter smoothing (non-dimensional);
$T_{BACK}$=the total time the projectile is tracked by the radar in seconds;

$T_{TRACK}$=that portion of the projectile flight time where extrapolation is required in seconds;

N=number of measurements processed by the radar.

As can be seen from the equations above, as QE becomes a small angle and approaches zero (i.e. direct fire), error in locating the fired weapon using the radar system 102, particularly the down range error component $\sigma_{DOWN}$ 142, becomes greatly exaggerated and approaches infinity. Minimizing the error components improves the accuracy with which the weapon firing location 130 can be determined.

It should be appreciated that FIG. 4 below shows a flowchart corresponding to the below contemplated technique which would be implemented in computer system 100 (FIG. 1). Rectangular elements (typified by element 154 in FIG. 4), herein denoted "processing blocks," represent computer software instructions or groups of instructions. Diamond shaped elements (typified by element 166 in FIG. 4), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Figure 4:
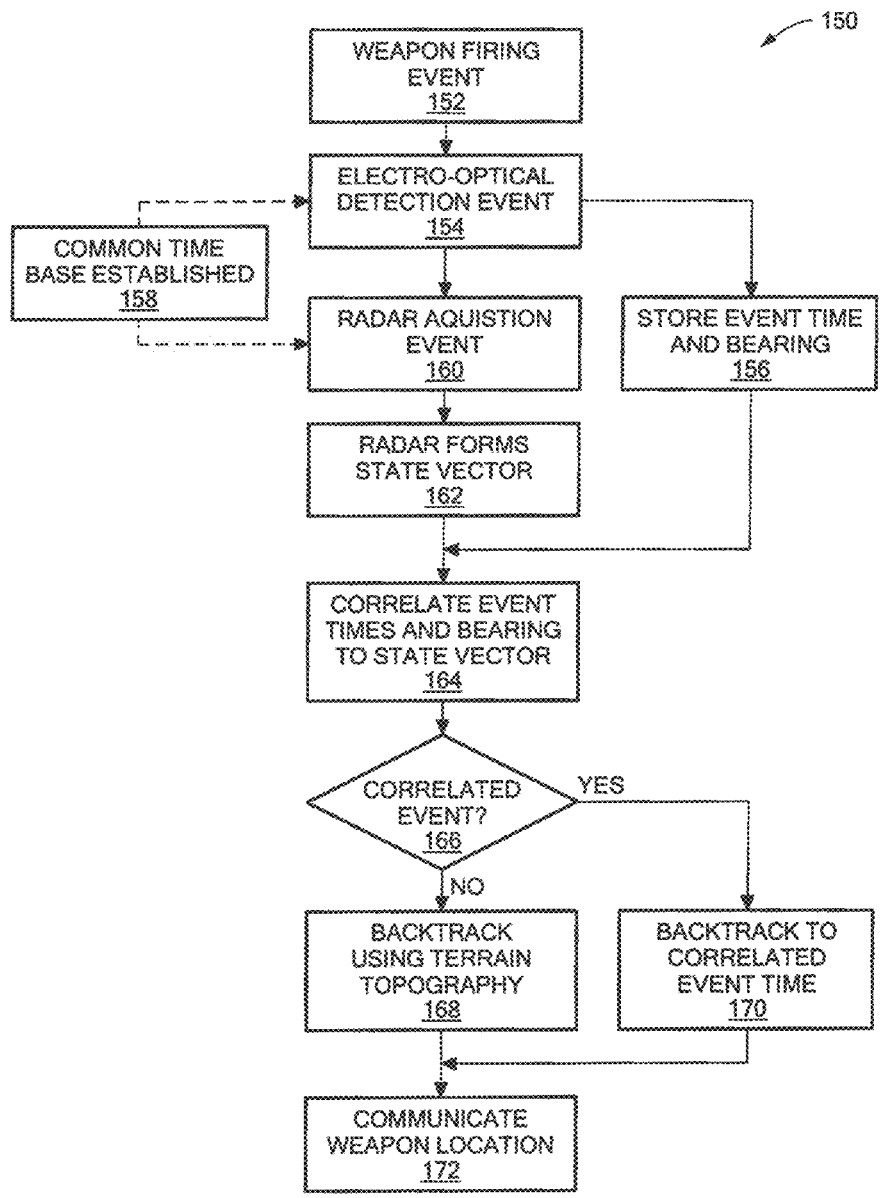
FIG. 4 is a flowchart illustrating a method of locating a weapon using an optically augmented weapon locating system having a radar system in combination with an optical sensor system according to an embodiment of the present invention.

Referring now to FIG. 4, an improved (optically augmented) method 150 of determining the weapon firing location 130 can improve the conventional identification of the location 130 of the weapon that fired the projectile.

As further discussed above, conventional backtracking of a state vector associated with a sequence of radar measurements backtracks the state vector until the backtracked state vector intersects a position in space identified by the backtracked state vector intersecting the terrain. The intersection in space can provide, within the intersecting state vector, a prediction in space of a location of a weapon, and also a prediction in time of when the weapon was fired. In contrast, techniques described below can backtrack the state vector until the backtracked state vector intersects a time identified by the backtracked state vector intersecting a time identified by the above-described optical sensor system 104. This intersection in time can also provide, within the intersecting state vector, a prediction in space of a location of the weapon and also a prediction in time (known by the optical sensor detection in time) of when the weapon was fired. Thus, both the conventional non-augmented weapon locating system and the optically augmented weapon locating system can provide both a prediction of a location of a weapon and either a prediction of, or knowledge of, a time of firing of the weapon.

Beginning at block 152, a weapon firing event occurs, resulting in light that propagates both directly and indirectly (e.g., scattered from the atmosphere) from the weapon to the optical sensor system, for example, to the optical sensor system 104 of FIG. 1. The light tends to occur as a flash having a time duration in accordance with the type of weapon fired. For example, if the light occurs due to a missile launch, the light can have a duration of about a second or more. For another example, if the light occurs due to a gun firing event, the light can have a duration of about tens of milliseconds or less. The light can result from an explosive event, e.g., a gunshot, or a controlled firing event, e.g., a rocket flame (or potentially a non-explosive event, e.g. someone lighting a cigarette or sun glint).

In general, the beginning of the light is indicative of a weapon firing event, however, for some types of weapon firing events, it may be desirable to mark the time of the weapon firing event as being a bit later in time, for example, if the light is generated by a prolonged rocket blast and the projectile is a rocket that accelerates relatively slowly.

The optical sensor system 104 may use the time duration of the flash event to classify the flash as to the flash's source. The time history may be used to discriminate out non-firings (e.g., sun glint, etc.) or to classify the firing event as to type (e.g., rocket, mortar, artillery, etc.). When classification data is available to the radar system 102 the radar system 102 can use the classification data to improve ballistic estimator performance through better modeling of the projectile, to adjust the projectile's firing time to reflect the time the projectile actually began to leave the lunch platform (for example, rockets may require time to build thrust) and to eliminate possible false radar detections.

At step 154, an optical detection of a weapon firing event occurs where the optical sensor system 104 detects the light associated with the weapon firing event 152.

At step 156, the time of the detection event 154 can be stored, for example in a memory device associated with the optical sensor system 104 or with the signal processing system 106. In some embodiments, the optical sensor system 104 (FIG. 1) is directional, in which case, a bearing (i.e., direction) associated with the EO detection event can also be stored. The optical sensor system 104 may have directional measurement capability in both bearing and elevation. When the optical sensor system 104 can measure direction, a means of aligning the optical system with the radar is provided.

At step 158, a common time base for the radar system 102 and for the optical sensor system 104 is established, for example using a global positioning system (GPS), inter-range instrumentation group (IRIG) time codes, or still another type of common clock. The common clock can be absolute or relative. This synchronization of the times for the systems 102, 104 will generally occur before the weapon firing event 152 and can be scheduled to occur with regularity so that the systems stay synchronized.

At step 160, a radar acquisition event, i.e., a radar detection of a projectile, occurs in which state information, such as altitude, speed, direction, acceleration, and time, associated with the projectile at the location 138 (FIG. 2) along the trajectory 132 (FIG. 2) is collected. The radar acquisition event, i.e., the radar detection, can occur after the weapon firing event detected by the optical sensor system 1-4 at block 154.

At step 162, the radar system 102, either alone or together with the signal processing system 106, forms a state vector using the state information associated with the projectile at location 138.

At step 164, a correlation between the EO detection event 154 and the radar acquisition event 160 is made, if possible, using the stored event time and, in some embodiment, bearing data.

The correlation can be made in a number or ways. For example, in some embodiments, the correlation is made by comparing the time of the EO detection event with a time of the radar detection. A time difference threshold can be established based upon the environment (i.e., the application) in which the system is used, and any time difference less than the time difference threshold can be indicative of a correlation. For example, if the system is used to detect locations of missile firing events, the time difference threshold can be relatively large, for example, 5 seconds. For another example, if the system is used to detect locations of close range gun firing events, the time difference threshold can be relatively small, for example, 0.1 seconds. Other time difference thresholds are possible.

As described above and further below, backtracking the state vector in steps below provides both a weapon firing location estimate and a firing time estimate.

In other embodiments, correlation can be established by comparing the time of the weapon firing event detected by the optical sensor system 104 (FIG. 1) with a time of the radar detection of the projectile when the state vector of the projectile is conventionally backtracked to intersect the terrain. A time difference threshold can be established based upon the environment (i.e., the application) in which the system is used, and any time difference less than the time difference threshold can be indicative of a correlation. For example, if the system is used to detect locations of missile firing events, the time difference threshold can be relatively large, for example, 5 seconds. For another example, if the system is used to detect locations of close range gun firing events, the time difference threshold can be relatively small, for example, 0.1 seconds. Other time difference thresholds are possible.

In other embodiments, correlation can be established by comparing results of the conventional backtracking of the radar state vector to intersect the terrain with the backtracking described herein and below that backtracks the radar state vector to a point in time (and resulting space) established by the optical sensor system 104. As described above, both methods generate a prediction of a position from which the weapon was fired. A position difference threshold can be established based upon the environment (i.e., the application) in which the system is used, and any position difference less than the position difference threshold can be indicative of a correlation. Other position difference thresholds are possible.

With regard to the above correlation that backtracks the state vector in conventional and also in optically enhanced ways, from discussion above, it will be understood that, for low QEs, the conventional method to estimate weapon position may have very large errors, thus the above correlation using a position difference threshold may only apply to QEs above a threshold QE.

In still other embodiments for which the optical sensor system 104 provides directional information, e.g., azimuth bearing and/or elevation angle of a detected firing event, correlation can be established by comparing the azimuth bearing and or the elevation angle reported by the optical sensor system 104 with the azimuth bearing and/or the elevation angle reported by the radar system 102. An azimuth angle difference threshold and/or an elevation angle difference threshold can be established based upon the environment (i.e., the application) in which the system is used, and any azimuth angle difference and/or elevation angle difference less than azimuth angle difference threshold and/or elevation angle difference threshold can be indicative of a correlation. For example, if the system is used to detect locations of missile firing events, the azimuth angle difference threshold and/or the elevation angle difference threshold can be relatively large, for example, both 10.0 degrees. For another example, if the system is used to detect locations of close range gun firing events, the azimuth angle difference threshold and/or the elevation angle difference threshold can be relatively small, for example, both 1.0 degrees. Other angle difference thresholds are possible.

Four correlation techniques are described above. It should be understood that any one or more of the four techniques can be used to identify a correlation between radar detected events and firing events detected by the optical sensor system 104. Some correlations can be deemed to be primary and others can be deemed to be secondary, in any combination.

Other correlation techniques are also possible, including techniques that make use of the directional capability of some optical sensor systems.

At step 166, a determination is made as to whether the weapon firing event detected by the optical sensor system at block 154 and the radar acquisition event detected by the radar system 102 at block 160 correlate. If a correlation cannot be made, at step 168 a potential (and possibly less accurate) weapon firing location can be determined by conventionally backtracking the state vector until it intersects the terrain topography. Extrapolation techniques can be used to perform the backtracking.

If a correlation can be made, at step 170 a more accurate weapon firing location can be determined by the optically augmented weapon locating system 100 (FIG. 1) by backtracking the state vector, not to an intersection with the terrain, but instead to an intersection in time with the weapon firing event time identified by the optical sensors system 104. Extrapolation and/or interpolation techniques can be used to perform the backtracking. Geographic coordinates associated with the backtracked state vector at the weapon firing event time identified by the optical sensor system 104 are calculated to establish a likely location of the weapon that fired the projectile. This calculated location of the weapon is more accurate than that described above using the radar system 102 alone.

At step 172, the coordinates associated with the likely location of the fired weapon are communicated to the response system 108 (FIG. 1). The response system 108 can direct a counter fire weapon capable of returning fire to the location of the fired weapon. Alternatively, the response system 108 can associate the location of the fired weapon with friendly fire from allied forces for purposes of mapping the location of allied forces. In still another alternative, the response system 108 can map the location of the fired weapon for use by peace-keeping or law enforcement agencies to determine a geographic area for follow-up investigation or patrol.

Figure 5:
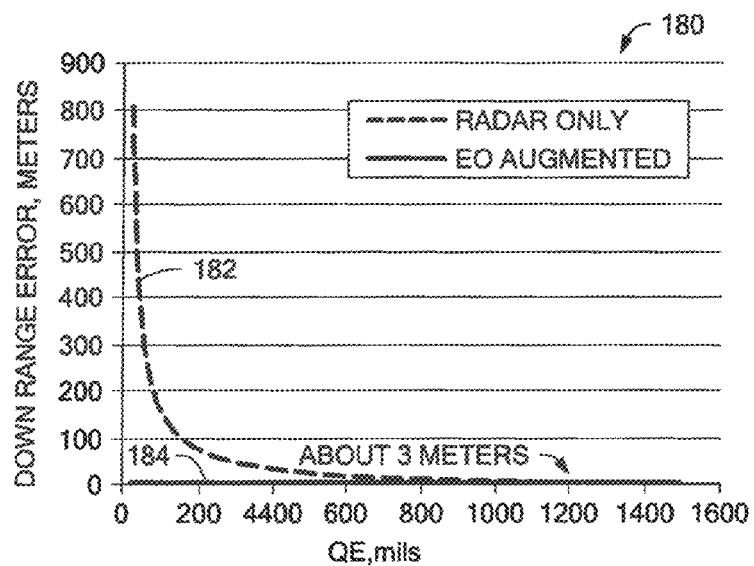
FIG. 5 is a graph of down range error for both optically augmented and non-augmented conventional weapon locating systems at various quadrant elevations.

Referring now to FIG. 5, a graph 180 compares down range error at various quadrant elevations for one example of a non-augmented conventional weapon locating system having only a radar system and one example of an optically augmented weapon locating system having both a radar system and an optical sensor system. Alternative embodiments of optically augmented and non-augmented conventional weapon locating systems may result in different error responses. In the embodiment of FIG. 5, the plotted data set 182 shows a relationship between the QE of a firing weapon and the down range error component ($\sigma_{DOWN}$) associated with the use of a non-augmented conventional weapon locating system having the radar system 102 but not the optical sensor system 104. The graph 180 shows, for example, that at a QE of 200 mils (approx. 11.25°), the down range error associated with the non-augmented conventional weapon locating system is approximately 75 meters. As the QE of the firing weapon approaches 0 mils, the error increases exponentially, rendering the non-augmented conventional weapon locating system relatively ineffectual in determining the location of the firing weapon.

A plotted data set 184 shows a relationship between the QE of the fired weapon and the down range error component associated with the use of an optically augmented weapon locating system, e.g., 100 of FIG. 1, having both a radar system and an optical sensor system, such as an EO sensor, as described above in conjunction with FIG. 2. As shown, the down range error associated with firing weapon QE values between approximately 0 mils and approximately 1500 mils (approx. 84.4°) is approximately constant at about 3 meters. Thus, the down range comparison graph 180 shows that backtracking the state vector of a projectile, as formed by a non-augmented conventional weapon locating system, to a time associated with a weapon firing event, as detected by an optical sensor system in an optically augmented weapon locating system, results in improved weapon locating for low QE values of the firing weapon. It is understood that the results presented in FIG. 5 are just one example of optically augmented and non-augmented conventional weapon locating system down range error values. For alternative embodiments, using different radar and optical sensor systems, the results may vary.

Figure 6:
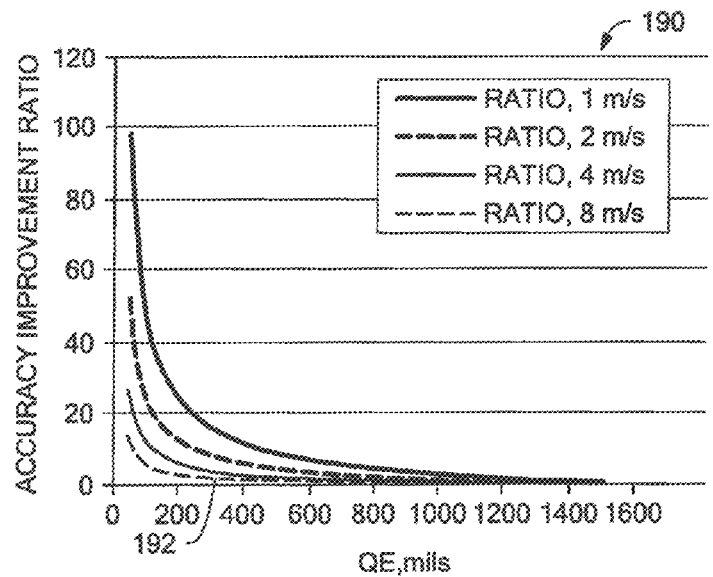
FIG. 6 is a graph of accuracy improvement ratios for an optically augmented weapon locating system at various quadrant elevations.

Referring now to FIG. 6, a graph 190 demonstrates the potential accuracy improvement associated with using an optically augmented weapon locating system according to the method of FIG. 4, even when errors exist in the velocity associated with the radar generated state vector. The accuracy improvement ratio is a ratio of the down range error component ($\sigma_{DOWN}$) of the non-augmented conventional system to the optically augmented system. Any ratio greater than one indicates an improvement. The data set 192 of graph 190 shows, for example, that for a velocity error of 8 m/s, the poorest radar system performance shown on the graph, the radar system performance is improved by optical augmentation, wherein the augmented improvement (i.e. an accuracy improvement ratio of one) occurs at a firing weapon QE of 600 mils (approx. 34°). As the plot 192 shows, the accuracy improvement ratio continues to increase for lower QEs. It is understood that the results presented in FIG. 6 are just one example of the potential weapon locating improvement associated with an optically augmented weapon locating system. For alternative embodiments, using different radar systems and different optical sensor systems, the results may be different.

All references cited herein are hereby incorporated herein by reference in their entirety. Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A method of locating a weapon, comprising:
    detecting a weapon firing event with an optical sensor system, the detected weapon firing event indicative of a detected firing of the weapon and indicative of a detected time of the weapon firing event;
    detecting a projectile fired from the weapon with a radar system;
    calculating a state vector associated with the projectile detection;
    identifying a location of the weapon, wherein the identifying comprises:
        backtracking the state vector until the backtracked state vector intersects with the detected time of the weapon firing event detected by the optical sensor system; and
        using the intersection to identify the location of the weapon; wherein the method further comprises:
    communicating the location of the weapon.

2. The method of claim 1, further comprising generating a common time base for the weapon firing event and for the projectile detection.

3. The method of claim 1, wherein the optical sensor system comprises an electro-optical sensor.

4. The method of claim 1, wherein the optical sensor system comprises a flash detection capability.

5. The method of claim 1, wherein the optical sensor system is directional and provides at least one of an azimuth angle of the detected weapon firing event or an elevation angle of the detected weapon firing event.

6. The method of claim 1, wherein the optical sensor system comprises a visible light optical sensor.

7. The method of claim 1, wherein the optical sensor system comprises an infrared optical sensor.

8. The method of claim 1, wherein the optical sensor system comprises an ultraviolet optical sensor.

9. The method of claim 1, wherein the step of detecting the weapon firing event with the optical sensor system comprises detecting the weapon firing event by direct path detection of light generated by the weapon firing event.

10. The method of claim 1, wherein the step of detecting the weapon firing event with the optical sensor system comprises detecting the weapon firing event by indirect path detection of scattered light from light generated by the weapon firing event.

11. The method of claim 1, wherein the step of detecting the weapon firing event with the optical sensor system comprises detecting visible light generated by the weapon firing event.

12. The method of claim 1, wherein the step of detecting the weapon firing event with the optical sensor system comprises detecting infrared light generated by the weapon firing event.

13. The method of claim 1, wherein the step of detecting the weapon firing event with the optical sensor system comprises detecting ultraviolet light generated by the weapon firing event.

14. The method of claim 1, further comprising correlating the weapon firing event detected by the optical sensor system with the detection of the projectile by the radar system to determine if the weapon firing event detected by the optical sensor system corresponds to the same projectile as that detected by the radar system.

15. The method of claim 14, wherein the correlating comprises:
    selecting a time difference threshold; and
    relating the time difference threshold to a difference between the detected time of the weapon firing event detected by the optical sensor system and a time of the detection of the projectile by the radar system.

16. The method of claim 14, wherein the correlating comprises:
    selecting a time difference threshold; and
    relating the time difference threshold to a difference between a time predicted by the state vector when backtracked to a terrain and the detected time of the weapon firing event detected by the optical sensor system.

17. The method of claim 14, wherein the correlating comprises:
- selecting a position difference threshold; and
- relating the position difference threshold to a difference between a location predicted by the state vector when backtracked to a terrain and a location predicted by the state vector when backtracked to the detected time of the weapon firing event detected by the optical sensor system.

18. The method of claim 14, wherein the correlating comprises:
- selecting an angle difference threshold; and
- relating the angle difference threshold to a difference between an angle to the projectile identified by the radar system and an angle to the weapon identified by the optical sensor system.

19. A weapon locating system, comprising:
- an optical sensor system configured to detect a weapon firing event, the detected weapon firing event indicative of a detected firing of the weapon and indicative of a detected time of the weapon firing event;
- a radar system configured to detect a projectile fired from the weapon;
- a processor configured to calculate a state vector associated with the projectile detection and to backtrack the state vector until the backtracked state vector intersects with the detected time of the weapon firing event detected by the optical sensor system, the processor further configured to use the intersection to identify the location of the weapon; and
- a communication system configured to communicate the location of the weapon.

20. The weapon locating system of claim 19, wherein the optical sensor system comprises an electro-optical sensor system.

21. The weapon locating system of claim 19, wherein the optical sensor system comprises a flash detection capability.

22. The weapon locating system of claim 19, wherein the optical sensor system comprises an infrared optical sensor system.

23. The weapon locating system of claim 19, wherein the optical sensor system comprises a visible light optical sensor system.

24. The weapon locating system of claim 19, wherein the optical sensor system comprises an ultraviolet optical sensor system.

25. The weapon locating system of claim 19, wherein the processor is further configured to correlate the weapon firing event detected by the optical sensor system with the detection of the projectile by the radar system to determine if the weapon firing event detected by the optical sensor system corresponds to the same projectile as that detected by the radar system.

\* \* \* \* \*